(12) United States Patent
Newhouse et al.

(10) Patent No.: US 7,280,464 B1
(45) Date of Patent: Oct. 9, 2007

(54) FEATURELESS SYNCHRONIZATION IN MULTI-USER OFDM

(75) Inventors: Michael N. Newhouse, Cedar Rapids, IA (US); Daniel M. Zange, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1076 days.

(21) Appl. No.: 10/259,767

(22) Filed: Sep. 27, 2002

(51) Int. Cl.
*H04J 11/00* (2006.01)
(52) U.S. Cl. ........................ 370/203; 371/210
(58) Field of Classification Search ............... 370/203, 370/210
See application file for complete search history.

(56) References Cited

U.S. PATENT DOCUMENTS

| | | | |
|---|---|---|---|
| 6,373,861 B1 * | 4/2002 | Lee | 370/503 |
| 2006/0098752 A1 * | 5/2006 | Song et al. | 375/260 |

OTHER PUBLICATIONS

"Time and Frequency Synchronization for OFDM using PN-Sequence Preambles", by Fredrik Tufvesson et al. Proc. of IEEE Vehicular Technology Conference, Amsterdam, The Netherlands, Sep. 1999.
"Synchronization Requirements for Multi-user OFDM on Satellite Mobile and Two-path Rayleigh Fading Channels", by Lei Wei et al. IEEE Transactions on Communications, vol. 43, No. 2/3/4, Feb./Mar./Apr. 1995.

* cited by examiner

*Primary Examiner*—Melvin Marcelo
(74) *Attorney, Agent, or Firm*—Nathan O. Jensen; Kyle Eppele (57) ABSTRACT

An orthogonal frequency division multiplexing (OFDM) communications system transmits data on a plurality of subcarriers and has a featureless synchronization signal. The OFDM communications system transmits synchronization tones on pseudorandomly selected subcarriers. A receiver generates the same synchronization tones and performs a correlation on the received signal with the receiver synchronization tones. The correlation is performed at the beginning and the end of the synchronization symbol. A product of the two correlations results in a magnitude peak and a phase difference. The magnitude peak is used to determine the location in time of the sync symbol and the phase difference is used to determine the frequency offset of the received signal.

20 Claims, 6 Drawing Sheets

FEATURELESS SYNCHRONIZATION IN MULTI-USER OFDM

GOVERNMENT RIGHTS

This invention was made under Government contract No. DAAD19-01-9-0002 awarded by DARPA. The Government may have certain rights in the Invention.

BACKGROUND OF THE INVENTION

This invention relates to communications systems, multicarrier modulation systems, orthogonal frequency division multiplexing (OFDM), and specifically to synchronization in an OFDM system.

OFDM principles have been known in the art for many years. In recent years, OFDM has been applied to broadcasting in such systems as the European DAB (digital audio broadcasting) standard, to high definition television (HDTV) and to communications systems for military and civilian applications requiring high digital data rates over narrow bandwidths. OFDM is the modulation format included in IEEE Standard 802.11b.

OFDM uses multiple orthogonal subcarriers with minimal subcarrier spacing to convey information over multiple subchannels. Sequential streams of data are transmitted simultaneously on each subcarrier and at any instant in time many data symbols are being transmitted. A high data rate stream may be broken into many low data rate streams and transmitted over an OFDM system. In a multiuser system, many users may each use one or more of the subchannels. The bandwidth of every individual data stream occupies a small fraction of the available bandwidth. By transmitting data simultaneously on many low-rate subchannels, a wideband transmission system is converted Into many narrowband systems. To obtain high spectral efficiency, the frequency spectrums of the subcarriers partially overlap with specific orthogonality requirements to enable separation of the subcarriers at a receiver. The larger the number of subcarriers, N, the longer the symbol period becomes making the system less susceptible to burst errors and delay spread. The number of subcarriers N, however, is in practice limited by the filtering process, computational time, the available transmission bandwidth of the channel, and the Doppler shift.

Orthogonality between the subcarriers can be maintained, even if the signal is passed through a time-dispersive channel, by adding a cyclic prefix or extension at the beginning of every OFDM symbol. The cyclic extension is a copy of the last part of the OFDM symbol of length equal to or greater than the maximum delay spread of the channel. Insertion of the cyclic extension imposes a penalty in terms of transmitted power and available bandwidth but improves symbol timing to reduce intersymbol interference (ISI).

In a transmitter in an OFDM system, a serial input data stream is converted to parallel data. Forward error correction may used on the data stream. The parallel data stream is then applied to a signal mapper to set the amplitude and phase of each subcarrier in the form of complex values according to a predetermined modulation constellation. Such modulation formats as quadrature amplitude modulation (QAM) and quadrature phase shift keying (QPSK) may be used. An inverse fast Fourier transform (IFFT) converts the frequency-domain phase and amplitude data for each subcarrier into a block of N time domain samples. The samples are combined together and the cyclic extension is added. The resulting time domain samples are then converted to an analog modulating signal that is then input to a RF modulator and transmitted. The reverse process is implemented in an OFDM receiver. An FFT is used to extract the phase and amplitude of each received subcarrier from the block of received samples.

Synchronization is required between the transmitter and the receiver for the receiver to recover the data. Synchronization is required to correct for frequency offsets between oscillators in the transmitter and receiver. Such frequency offsets cause loss of orthogonality leading to intercarrier interference (ICI). Symbol synchronization is also required at the receiver to know where a data symbol starts. A timing offset results in phase rotation of the subcarriers. Use of the cyclic extension reduces the timing error problem.

Communications systems for military applications place several constraints on the over-the-air waveform utilized. The waveform should have a low probability of intercept and detection (LPI/LPD) and be resistant to jamming threats.

Traditional OFDM systems use the cyclic extension or a zero extension between bursts for multipath mitigation and timing synchronization. This cyclic extension, however, provides a significant feature to the transmitted waveform. A synchronization pattern may be used on some of the subchannels in an OFDM system. The synchronization pattern traditionally uses a specific set of tones in an OFDM symbol in the transmitter to generate a time domain sequence. The time domain sequence has repeating patterns that are used in the receiver to extract time and frequency information. This obviously contains a feature that can be exploited by an adversary. As an option to this, some systems use single carrier synchronization symbols to obtain time and frequency information.

A featureless symbol buffer in place of the cyclic extension or zero extension maintains the multipath mitigation properties of the OFDM waveform while reducing the delectability. Simulation and analysis show that a small cyclic extension with the remainder of the burst being random In nature IS not easily detectable and yet provides desirable attributes to the transmitted waveform.

A synchronization method is required that will not interfere with other users sharing the same channel bandwidth while at the same time not providing any easily detectable features.

SUMMARY OF THE INVENTION

An orthogonal frequency division multiplexing (OFDM) communication system is disclosed. The OFDM communications system transmits data on a plurality of subcarriers and uses a featureless synchronization signal transmitted on some of the subcarriers. The synchronization signal is used to correct for a frequency offset and to synchronize a received signal.

The OFDM communications system comprises a transmitter with a coding function that receives a data input signal and modulates and encodes the data input signal into complex frequency domain data samples. A PN sync generator in the transmitter generates transmit synchronization tones. An IFFT function converts the complex frequency domain data samples and the transmit synchronization tones into complex time domain samples In a plurality of IFFT bins on the subcarriers. An add symbol buffer adds a cyclic extension to the complex time domain samples on the subcarriers for protection against intersymbol interference. A digital IF conversion function for converts the complex time domain samples on the subcarriers to an IF signal that is translated to transmit the complex time domain samples.

The OFDM communications system includes a receiver that receives the transmitted complex time domain samples. The receiver comprises a digital IF down conversion for converting the received complex time domain samples. A PN sync generator in the receiver generates receive synchronization tones. A synchronization correlator performs timing and frequency estimation on the receiver complex time domain samples by correlating the transmit and the receive synchronization tones to generate a frequency vector and a timing control signal. A multiplier multiplies the receiver complex time domain samples by the frequency vector to correct for the frequency offset. A remove symbol buffer in the receiver removes the cyclic extension placed on the signal by the transmitter. A FFT converts the receiver complex time domain samples Into the frequency domain samples. A decoder demodulates and decodes the frequency domain samples.

In the orthogonal frequency division multiplexing communication system transmitter the transmit synchronization tones occupy a number of IFFT bins pseudorandomly selected from the plurality of IFFT bins. The transmitter further comprises a switch for switching between the complex frequency domain data samples and the transmit synchronization tones to place the synchronization tones in the number of IFFT bins.

The orthogonal frequency division multiplexing communications system receiver includes a synchronization IFFT that generates time domain receive synchronization tones from the receive synchronization tones. The synchronization correlator performs correlations on the received complex time domain samples containing the transmit synchronization tones in the pseudorandomly selected IFFT bins by correlating with the time domain receive synchronization tones. The synchronization correlator performs a first correlation on a beginning of the received complex time domain sample series with a first correlation vector and a second correlation at an end of the received complex time domain series with a second correlation vector. A correlation vector generator generates the first correlation vector and the second correlation vector. The synchronization correlator performs the first correlation until a threshold is exceeded and continues monitoring the first correlation until the second correlation is performed and then continues to use the first correlation vector to determine when a more significant correlation occurs. When a larger magnitude correlation occurs between the first and second correlation, the synchronization correlator determines a desired location of the transmitted signal. The synchronization correlator determines received signal synchronization when a product of the first and second correlation reaches a peak at a predetermined location after the first correlation. The synchronization correlator performs correlations on additional received symbols to improve accuracy.

It is an object of the present invention to provide featureless synchronization in a multiuser OFDM communications system.

It is an object of the present invention to provide a synchronization method in an OFDM communications system that will not interfere with other users.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
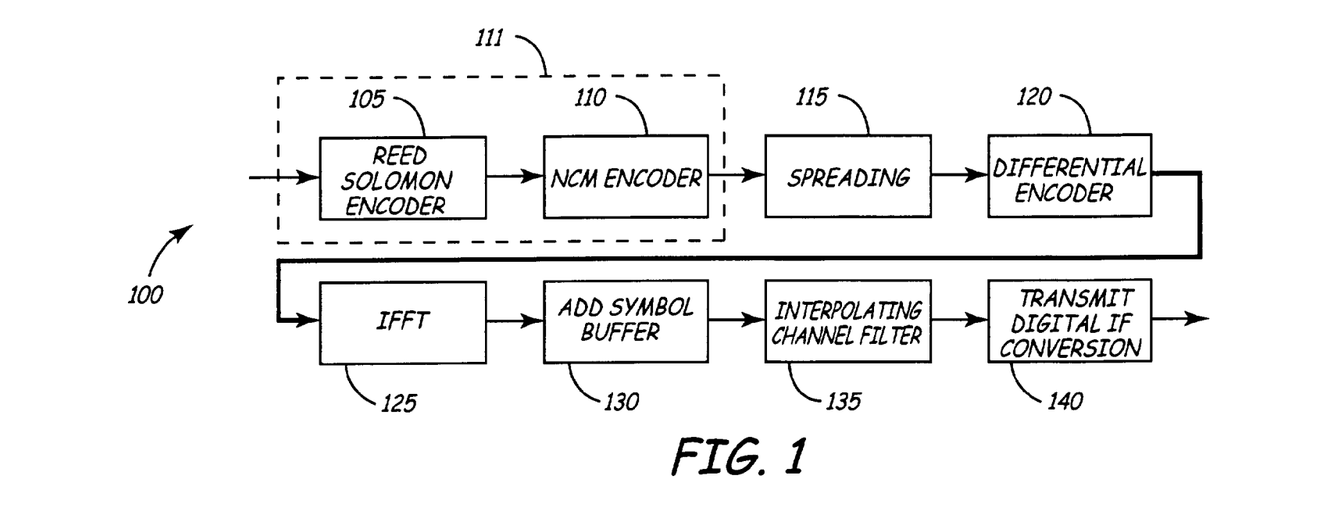
FIG. 1 is a block diagram of transmitter signal processing blocks in an OFDM communications system.
Figure 7:
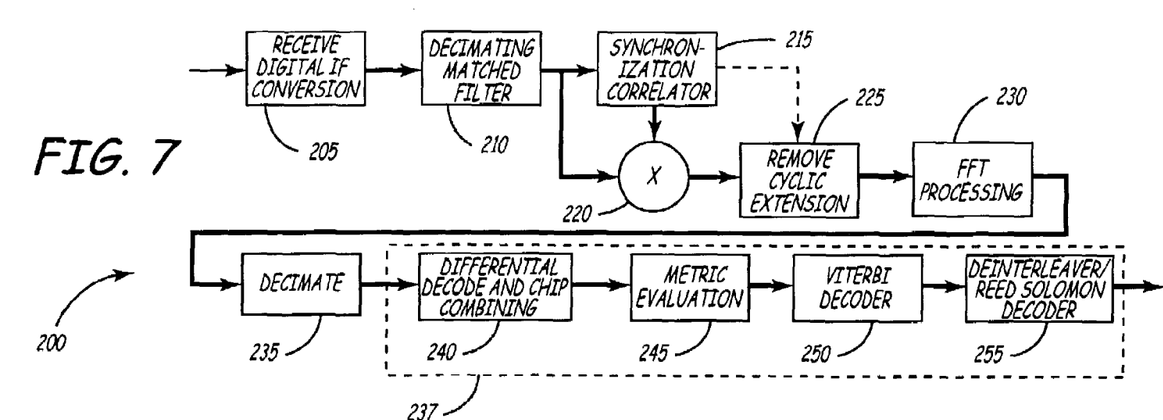
FIG. 7 is a block diagram showing receiver signal processing In the OFDM communications system.

FIG. 1 is a block diagram of an OFDM transmitter 100 and FIG. 7 is a block diagram of an OFDM receiver 200 for use in a military communications system with antijam and LPI/LPD capabilities that may employ the present invention. The block diagrams of FIGS. 1 and 7 and the other figures herein are used to illustrate the present invention. The block diagram of FIG. 1 and others Include elements important to a military communications system incorporating the present invention. The present invention may be included in a system not having the elements shown, as someone skilled in the art would readily ascertain. The following paragraphs describe in detail the specific implementation of each of the blocks of FIG. 1. Specific values and parameters are shown for the purposes of this discussion while other values and parameters may be used to implement the present invention.

Parameters for a typical waveform that might be used in the OFDM transmitter of FIG. 1 are summarized in Table 1. The table shows an option for either 25-kHz or 39.062-kHz subcarrier channel spacing. The data symbol length is the inverse of the subcarrier channel spacing. The channel width is proportional to the channel spacing because each uses a 255-point IFFT 125 of FIG. 1. The number of carriers used is 224 with the remaining 32 used for shaping the passband with a realizable digital filter.

A longer symbol length provides improved performance in time selective channels while a shorter length provides increased data throughput The 256 point FFT used in the exemplary transmitter signal processing operates in about 20 msec.

Forward error correction used in the transmitter 100 is a concatenated code with a trellis coded inner code and a Reed Solomon (RS) outer code. A coding function block 111 performs the coding and modulation. The rate of the inner code varies with the modulation on the subcarriers. The RS outer code is (224, 194), which can correct up to 15 symbol errors in a 224 symbol received data stream. Each RS symbol is eight bits. Reference and synchronization symbols are required for differential encoding reference and time and frequency estimation, respectively. The use of these symbols is discussed in more detail in below.

TABLE 1

| Parameter | 6.4 MHz Channel | 10 MHz Channel |
|---|---|---|
| Bin Spacing | 25 kHz | 39.0625 kHz |
| FFT Size | 256 | 256 |
| Usable Carriers per Symbol | 224 | 224 |
| Data Symbol Length | 40.0 μsec | 25.6 μsec |
| Bits in Information Channel | 12048 | 12048 |
| Bits in Control Channel | 200 | 200 |
| Reed Solomon Code Rate | 194/224 | 194/224 |
| Synchronization Symbols | 2 | 2 |
| Reference Symbols | 2 | 2 |

Using the waveform parameters of Table 1, a range of supported data rates can be derived by varying the ratio of source data bit rate to the number of carriers in an OFDM symbol. An example is shown In Table 2 for an OFDM waveform with 39.0625 kHz subcarrier spacing. In this table, two subcarrier modulation formats are assumed. Modes 0-2, 6-8, and 12-14 use differential 8-ary phase shift keying (D8-PSK). The remaining modes use differential quadrature phase shift keying (DQPSK). The D8-PSK modes use a rate ⅔ trellis encoder for 2 bits per subcarrier and the DQPSK modes use a rate ½ trellis encoder for 1 bit per subcarrier.

In OFDM, multi-user communications can be supported in having each user transmit on only a subset of the available carriers. This is represented in Table 2 in modes 6-8 and 9-11 with a factor L. Up to eight users can be supported when L=1 for each of the eight users. The maximum data rate is 1.49 Mbps for each user in this case. When a specific node requires increased throughput, L increases to obtain the desired throughput at the expense of support of additional users on the channel.

Frequency domain spread spectrum is obtained by transmitting an encoded subsymbol on multiple subcarriers. This waveform supports spreading ratios of $2^n$ with n ranging from 0 to 8. That is, the minimum spreading ratio is one subcarrier per coded subsymbol and the maximum is 256 subcarriers per coded subsymbol. The data rate with spreading scales approximately with the spreading ratio. It is not exact because the overhead associated with synchronization, range delay, and other sources decreases as a percentage of the data payload size.

TABLE 2

| | | Multi-Rate Modes | | | | | |
|---|---|---|---|---|---|---|---|
| | | 0-2 | 3-5 | 6-8 | 9-11 | 12-14 | 15-17 |
| Data Rate in Mbps with Variable Guard Time | 1/16 | 11.91 | 6.40 | ~1.49*L/$2^6$ | ~0.80*L/$2^6$ | ~11.91/$2^5$ | ~6.40/$2^3$ |
| | ⅛ | 11.27 | 6.05 | ~1.41*L/$2^5$ | ~0.76*L/$2^1$ | ~11.27/$2^5$ | ~6.05/$2^1$ |
| | ¼ | 10.18 | 5.46 | ~1.27*L/$2^5$ | ~0.68*L/$2^8$ | ~10.18/$2^5$ | ~5.46/$2^1$ |
| Over-the-Air Rate in Mbps | 1/16 | 24.71 | 16.47 | ~3.09*L/$2^5$ | ~2.06*L/$2^1$ | ~24.71/$2^5$ | ~16.47/$2^8$ |
| | ⅛ | 23.33 | 15.56 | ~2.92*L/$2^5$ | ~1.95*L/$2^1$ | ~23.33/$2^5$ | ~15.56/$2^1$ |
| | ¼ | 21.00 | 14.00 | ~2.62*L/$2^6$ | ~1.75*L/$2^1$ | ~21.00/$2^8$ | ~14.00/$2^8$ |
| Modulation | | D8-PSK | DQPSK | D8-PSK | DQPSK | D8-PSK | DQPSK |
| Carriers/Symbol | | 224 | 224 | L*28 | L*28 | 224 | 224 |
| DS Spreading | | 1 | 1 | $2^5$ | $2^1$ | $2^8$ | $2^1$ |
| Channel FH Spreading | | 20 | 20 | 20 | 20 | 20 | 20 |

The input to the transmitter 100 in FIG. 1 is digital data that may be at a variable rate data. The OFDM transmitter 100 uses a concatenated code for forward error correction. The concatenated code uses a Reed Solomon (RS) outer code with convolutional encoder-based non-coherent coded modulation (NCM) for the inner code. A Reed Solomon encoder 105 and NCM encoder 110 perform the coding function 111.

Figure 2:
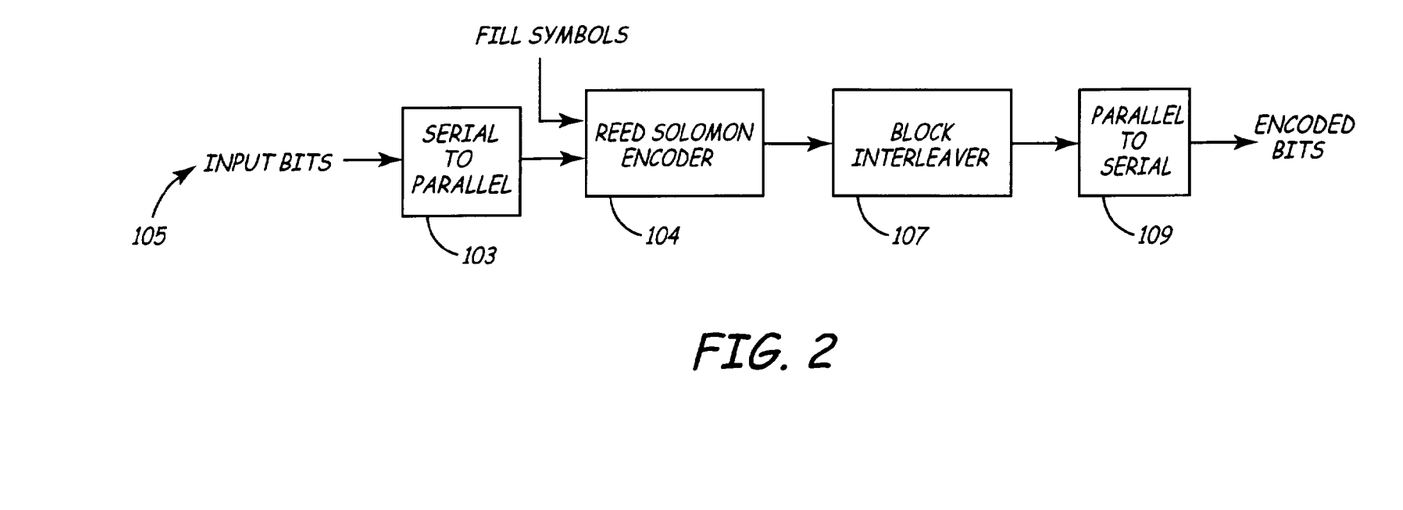
FIG. 2 is a block diagram of the processing for a Reed Solomon encoder of FIG. 1.

FIG. 2 is a block diagram showing exemplary Reed Solomon (RS) encoder 105 signal processing. The input data is converted to 8-bit symbols in a serial to parallel converter 103 in this example. Following this conversion, 194 8-bit symbols combine with 31 8 bit 0-fill symbols to form the Reed Solomon 104 input The RS 104 output is 255 symbols, 224 of which contain data. The 224 coded symbols pass through an 8-bit symbol block interleaver 107. The span of this block interleaver 107 is over the entire data slot. The block interleaver 107 spans these 1792 bytes with 32 columns and 56 rows, for example. The output data contains 1792 bits per Reed Solomon block.

Figure 3:
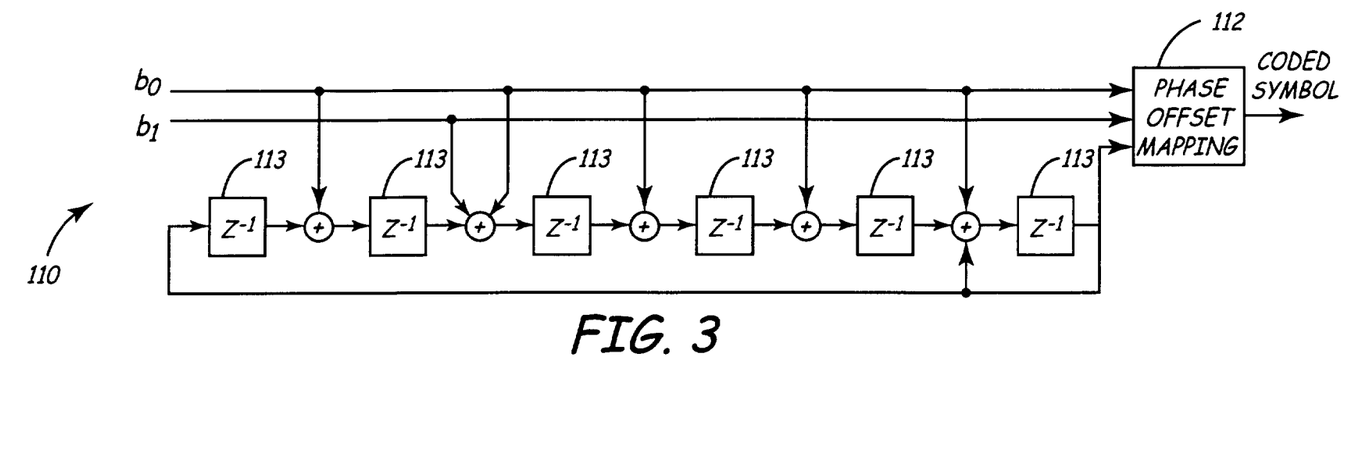
FIG. 3 is a block diagram of a NCM encoder of FIG. 1 with convolutional code and phase offset mapping.
Figure 4A:
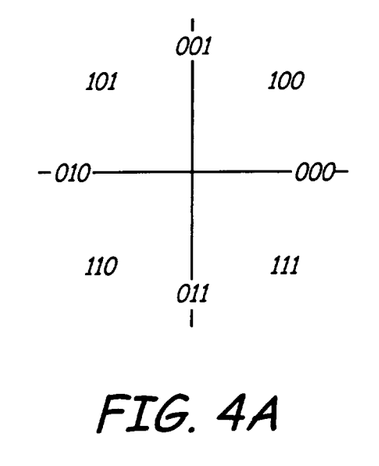
FIG. 4a is a diagram of bit to phase offset mappings for the NCM encoder of FIG. 3 in D8-DQPSK mode.
Figure 4B:
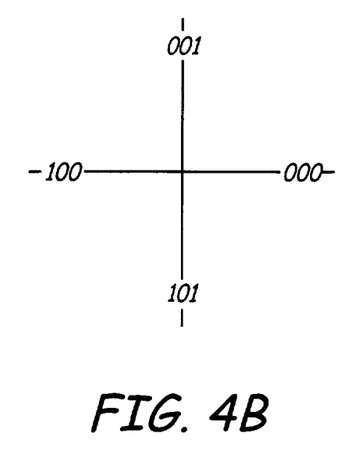
FIG. 4b is a diagram of bit to phase offset mappings for the NCM encoder of FIG. 3 in DQPSK mode.
Figure 5:
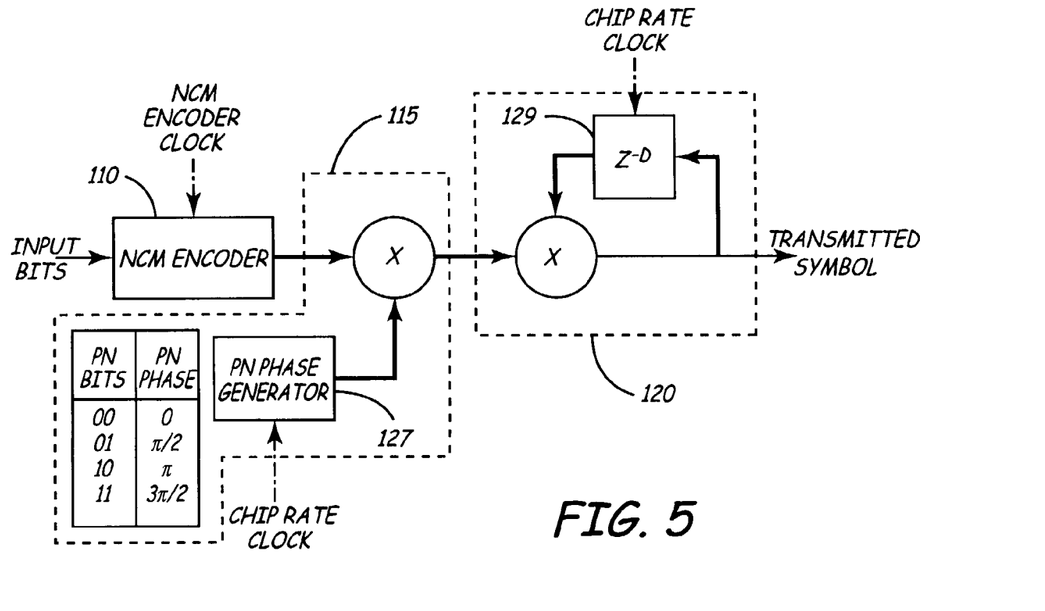
FIG. 5 is a block diagram showing frequency domain spreading with a differential encoder and the NCM encoder of FIG. 3.

The non-coherent trellis coded modulation (NCM) encoder 110 provides the bulk of the coding gain and a phase mapping function. FIG. 3 shows an exemplary rate ⅔, v=6, NCM encoder 110. A generator for this encoder 110 is 066-030-103. This generator determines the inputs to each delay block 113 based on the output of a previous delay block 113 and the input data. The first two numbers correspond to the input bits, $b_0$ and $b_1$, the last corresponds to the least significant bit of the current state of the encoder 110. In D-PSK mode, two input bits into phase offset mapping function 112 select a phase offset from the mapping shown in FIG. 4a. In DQPSK mode, only the $b_0$ input bit is active with $b_1$ tied to 0. The phase offset mapping of FIG. 4b selects the phase offset to apply as indicated in FIG. 5. The trellis generated by the encoder 110 of FIG. 3 with the phase offset mappings of FIGS. 4a and 4b generates a table of phase offset listings (not shown).

Note that this encoder 110 makes conversions from a rate ⅔ D8-PSK encoder to a rate ½ DQPSK encoder quite simple. In a traditional, feedback-free convolutional encoder, the transition is not quite as easy. By deactivating either $b_0$ or $b_1$, the output mapping is easily converted to a rate ½ structure. Simulations show that using $b_0$ gives slightly better performance than $b_1$. The phase offset mapping uses set partitioning. The basic idea in using set partitioning is to make the transitions into and out of a state have as large a Euclidean distance as possible, where the Euclidean distance, D, is defined as $$D=(I_1-I_2)^2+(Q_1-Q_2)^2.$$

Referring back to FIG. 1, the output of the NCM encoder 110 is connected to a frequency domain spreading function 115 whose output is then passed to a differential encoder 120 for further processing.

FIG. 5 shows the differential encoder 120 with PN generated randomized phase offsets from a PN phase generator 127 in the spreading function 115. In the PN phase generator 127, a PN generator or a TRANSEC device may be used to generate two pseudorandom bits. These two bits are converted to phase as indicated by the table in FIG. 5. This phase modifies the encoded phase from NCM encoder 110 to produce a pseudorandom phase on each subcarrier. The rate of the PN generator 127 is the chip rate, equal to one new phase per subcarrier. The rate of the NCM encoder 110 generated phase is a fraction of the PN generated phase equal to the spreading gain. For example, if the direct sequence spreading gain is 64, the chip rate clock is 64 times faster than the NCM encoder 110 clock shown in the figure. The amount of spreading is programmable.

The delay 129, D, in the differential encoder 120 in FIG. 5 is equal to the number of subcarriers used in the waveform or 224 in this example. Differential encoding across subcarriers is not recommended because the phase response of the channel is likely to vary with frequency.

An Inverse fast Fourier transform (IFFT) 125 In FIG. 1 converts complex frequency domain samples from the differential encoder 120 into a complex time domain series. The length of the IFFT 125 is the number of subcarriers into which the transmission bandwidth is split. In this example, the length of the IFFT is 256 with 224 of these tones containing data and 24, 12 on each edge of the channel, are zero-filled to ease requirements on channel and receive filters.

Figure 6:
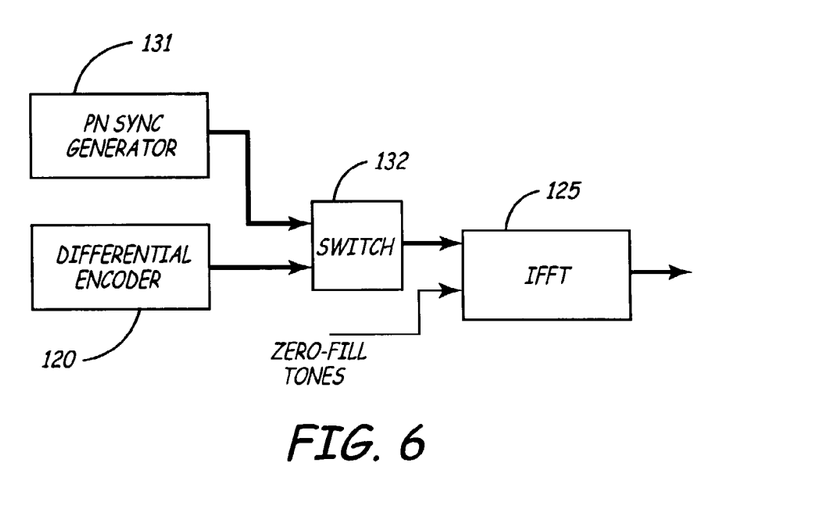
FIG. 6 is a block diagram showing data flow into an IFFT of the OFDM transmitter of FIG. 1.

In synchronization mode of the present invention, 28 IFFT bins contain data and 196 are left empty. The 28 bins contain PN generated QPSK modulated data. The 28 bins are selected pseudorandomly and correspond to the minimum set of bins used in a multi-user setting. That is, if L=1 in Table 2, modes 6-11, then the user has 28 pseudorandomly assigned frequency bins for data transmission. These same bins are used with a synchronization symbol with PN generated data. Either the synchronization tones from a PN sync generator 131 or the differentially encoded data from differential encoder 120 is selected with switch 132 into the IFFT 125 as shown in FIG. 6. The PN sync generator 131 and switch 132 are added between the differential encoder 120 and IFFT 125 of FIG. 1. The magnitude of the sync tones is eight times that of data tones when the maximum user data rate is used to ensure constant power over a transmitted burst.

At a receiver, a replica of the pseudorandom tone location and PN generated data passes through an IFFT to generate the correlation pattern for the receiver as is described later.

An add symbol buffer 130 in FIG. 1 protects against inter-symbol interference in an OFDM system. Typical symbol buffers in conventional OFDM systems are cyclic extensions and zero extensions. The cyclic extension copies the last part of the IFFT 125 output to the beginning of the time domain series. A zero extension copies zeros into this period. The disadvantage of both of these methods in a covert system is that each produces a signature in the waveform. The zero fill sections are easily detected by watching for fixed length bursts followed by data transmission. The cyclic extension essentially produces a correlative pattern in each transmitted symbol.

One method of reducing the effect of these signatures is to use a symbol buffer that uses a pseudorandom (PN) sequence for most of its duration. In a frequency domain multi-user environment, this PN sequence contains content only in the frequencies available for a specific user. This PN sequence is used for inter-symbol interference mitigation only. The remainder of the symbol buffer contains a small cyclic extension. The purpose of having a small cyclic extension is to allow for some symbol timing uncertainty in a receiver. In a differentially encoded system, this little bit of uncertainty in timing does not affect receive symbol decisions because only the difference in phase is important. A second advantage of using a small cyclic extension is to smooth out the discontinuity caused by the abrupt transition from symbol buffer to desired data. Having a small cyclic extension lessens the associated filtering distortions. Assuming that the length of this very short cyclic extension is only about eight 10-MHZ samples, or 0.8 msec, it does not add a significant feature to the transmitted waveform.

The length of the symbol buffer varies with the expected or measured Doppler. Table 2 shows three different symbol buffer lengths: ¹⁄₁₆, ⅛, and ¼ of the symbol length. As shown, the data rate decreases as the fraction Increases. The amount of multipath/inter-symbol interference that can be handled Increases as the fraction increases. In a network discovery mode, the largest of the symbol buffer options ensures that the communications system operates with maximum multipath protection. Node discovery slots must be sent using omni-directional antennas and so do not have the reduced multipath advantages of directional antennas. The minimum symbol buffer length would be used with directional antennas for reduced overhead and increased throughput.

An interpolating channel filter 135 in the OFDM transmit path of FIG. 1 is used to increase the IFFT output complex time domain sample rate to 25 Msps for 1 and Q data for a 50 Msps digital IF and to ensure that all of the subcarriers are within the channel passband using techniques known in the art.

A transmit digital IF up conversion 140 of FIG. 1 takes the baseband 25 Msps I and Q data and shifts it to a 12.5-MHz digital IF. The 12.5-MHz digital IF is then translated to a desired transmission frequency and transmitted over the communications channel using techniques well known in the art.

FIG. 7 is a block diagram of an OFDM receiver 200 showing the receive signal processing flow. The OFDM receiver 200 signal processing flow is essentially the same as the transmit signal flow shown In FIG. 1 but in reverse with the addition of blocks required for time and frequency synchronization. The input to the OFDM receiver 200 is 50-Msps data from an A/D converter (not shown). The output of the OFDM receiver 200 is variable rate Reed Solomon decoded data. The following paragraphs show the detail of each of the blocks of FIG. 7.

A receive digital IF down conversion 205 in FIG. 7 performs the opposite function of the transmit conversion 140 shown in FIG. 1. The output of the digital IF conversion stage 205 is baseband I and Q data at 25 Msps.

The digital IF conversion stage 205 output 25-Msps I and Q data is rate converted in a decimating matched filter 210 in FIG. 7 to an appropriate sampling frequency.

Figure 8:
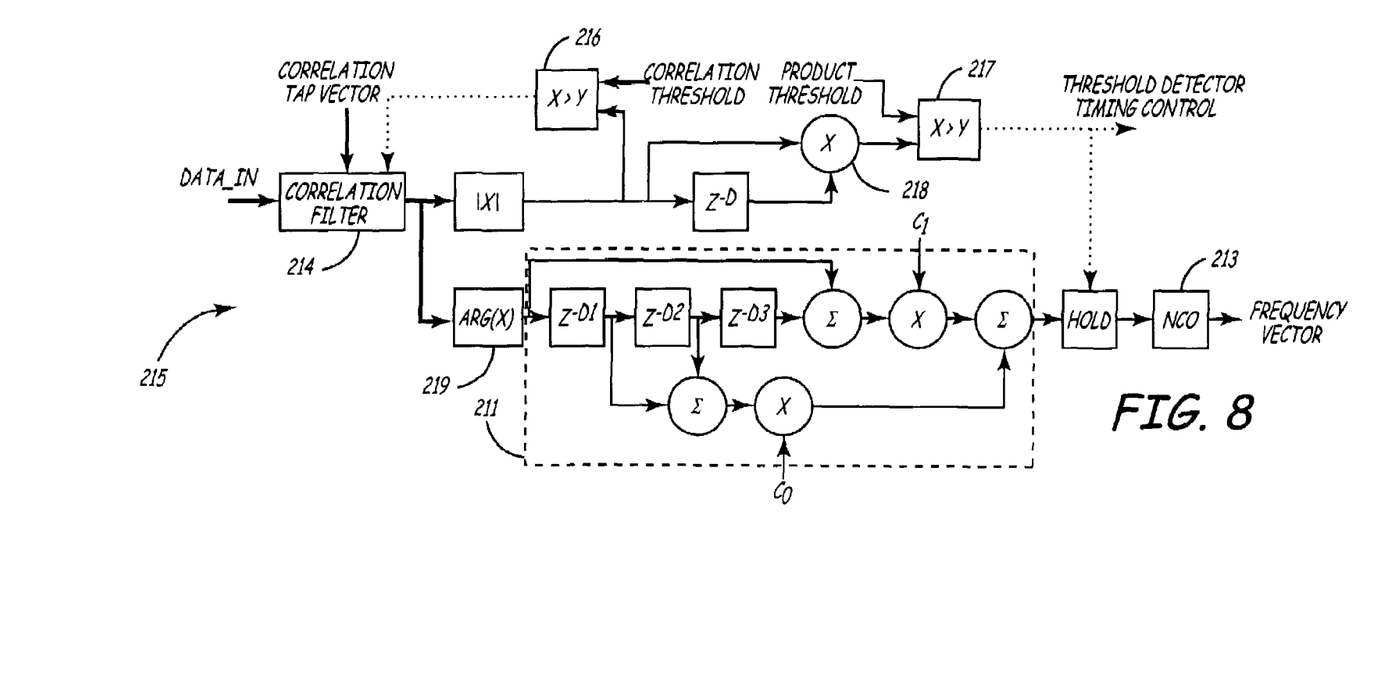
FIG. 8 is a block diagram of a synchronization correlator of FIG. 7.

A synchronization correlator 215 shown in FIGS. 7 and 8 performs the timing and frequency estimation for the received subcarrier bursts. The transmitter 100 and receiver 200 use the same set of pseudorandomly generated sequences generated by the PN sync generator 131 in FIG. 6 and FIG. 9. These sync sequences contain data in only bins assigned to a user as previously discussed. That is, if the user transmits on a set L*28 tones as described in Table 2, the correlation sequence generated contains pseudorandom 8-PSK tones in only those bins.

Figures 9, 10:
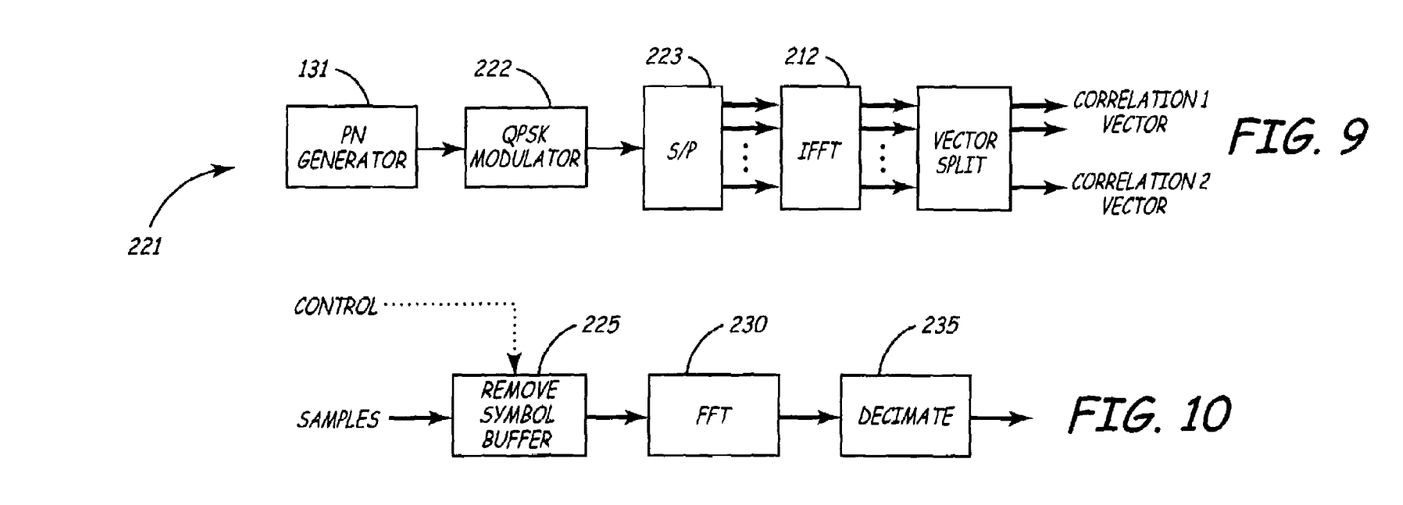
FIG. 9 is a block diagram of a correlator vector generation.
FIG. 10 is a diagram showing data flow Into a FFT for receive processing.

The receiver 200 generates correlation vector 1 and correlation vector 2 in A correlator vector generator 221 shown in FIG. 9. The PN sync generator 131 output is QPSK modulated in block 222, and then serial to parallel converted In block 223. The set of sync tones are the run through a synchronization IFFT 212 in FIG. 9 to generate the time domain sync sequence transmitted by the transmitter 100.

The receiver 200 performs two correlations, one on the beginning of the received IFFT 125 produced time domain series and one on the samples at the end using correlation vector 1 and correlation vector 2 respectively. The correlator 215 shown in FIG. 8 takes the samples transmitted first and loads them into a correlation filter 214. When the first correlation with correlation vector 1 exceeds a threshold as determined by comparator 216, the correlator 215 continues monitoring the correlation peaks until a second correlation pattern, the end of the received IFFT generated time series, is loaded into the correlator 215 and correlated with correlation vector 2. Correlation vector 1 continues to be used to determine when a more significant correlation occurs. When a larger magnitude correlation occurs between the first and second correlation, it is assumed to be the desired location of the transmitted signal. The received signal is synchronized if the product (block 218) of the first and second correlation reaches a magnitude peak at a predetermined location after the first correlation as determined by comparator 217. If the correlation does not reach a peak at this location, the first set of received signal samples is loaded back into the correlator filter 214.

The difference in the phase of the first and second complex correlations provides an estimate of the frequency offset the receiver 200 sees relative to the transmitter 100. This frequency estimation is given by the following equation:

$$\Delta f' = \frac{\hat{\phi}}{\pi' T}$$

where is the argument (block 219) of the integrated correlation value and T is the sample period.

To improve the accuracy of the frequency estimation, the receiver 200 utilizes a second synchronization symbol from the transmitter 100. This symbol provides additional phase measurements that can be used to provide more accurate frequency estimation. Having four phase estimations allows the calculation of six frequency estimations. The first phase estimate, $\phi_0$, is measured at the first correlation at time $T_0$, the second, $\phi_1$, at time $T_1$, the third, $\phi_2$, at time $T_2$ and the fourth, $\phi_3$, at time $T_3$. These four phase measurements provide six frequency estimates that can be averaged to produce one overall frequency estimate. Those six estimates are:

$$\Delta \hat{f}_{mn} = \frac{(\phi_m - \phi_n) f_s}{\pi (T_m - T_n)}$$

$$\Delta f'_{est} = \frac{1}{6} \sum_{mn} \Delta f'_{mn}$$

where $f_s$ is the sample frequency and $\Delta f_{mn}$ is the frequency estimate for phase measurements m and n. By combining the terms and recognizing the relationships between the correlation times, the following equation estimates the frequency offset:

$$\Delta f'_{est} = \frac{f_s}{6\pi} [(\phi_3 - \phi_o) C_o + (\phi_2 - \phi_1) C_1]$$

where C0 and C1 are constants dependent upon the length of the FFT, symbol buffer, and correlation sequence. This calculation is performed by block 211 in the synchronization correlator 215. The equations assume that the correlations occur at the beginning and end of the FFT outputs of the two synchronization symbols.

The maximum frequency offset that this algorithm can measure without phase ambiguity occurs when the phase estimate corresponding to the longest time difference, $T_m$-$T_n$, is $\pi$ radians. This value is dependent upon the length of the correlation sequence, the symbol buffer length and the FFT length. The longest time difference is $T_3$-$T_0$. In the worst case using the parameters given in Table 2 with a 64-tap correlator, this length is 512 samples (assuming a 256-point FFT and 64 sample symbol buffer). Assuming a $\pi$ radian phase difference between the first and last correlation, $\phi_3$-$\phi_0$, with a sampling frequency of 10 MHz, the maximum allowable frequency offset is 19.53 kHz in this example.

In FIG. 8, two outputs are shown from the correlator 215. One output is a frequency vector from a numerically controlled oscillator (NCO) 213 at the frequency offset $\Delta f_{est}$. This frequency vector output is multiplied with the input signal by multiplier 220 to correct for frequency offsets as shown in FIG. 7. A second output from the correlator 215 is a control output containing timing information. The second correlation peak occurs a fixed number of samples from the start of the data portion of the first OFDM data symbol. The timing control output points to this location.

The correlation method of the present invention enhances the LPD nature of the overall waveform while preserving the ability to support multiple users in the frequency domain or prevent interference with fixed communications services within the OFDM transmission band. Traditional methods of OFDM synchronization use either all or certain specific bins. The correlation method of the present invention can use any of the available FFT bins with receiver and transmitter synchronized PN modulated data with several constraints. The 224 available frequency bins are split into 28 sets of eight bins. In each of these 28 bins, one of eight is chosen pseudorandomly and modulated with the pseudorandom QPSK synchronization tone. Generation of the synchronization sequence In this manner allows for improved correlation properties. In addition, this method generates a featureless synchronization pattern suitable for OFDM with multiple access capability.

FIG. 10 shows additional receiver 200 processing into an FFT 230 of FIG. 7. A remove symbol buffer 225 removes the remaining samples from the end of the 256 FFT samples to the beginning of the next OFDM symbol under control from the synchronization correlator 215 timing control signal. The synchronization correlator 215 timing control signal indicates the sample position for the first sample of the next 256 samples into the FFT 230 for processing. The FFT 230 converts data from the time domain into the frequency domain. The complex frequency domain samples are then decimated from 256 to 224 complex samples In block 235 as shown in FIGS. 7 and 10. The decimation removes 16 samples from both the high and low ends of the spectrum for each FFT block output.

Figure 11:
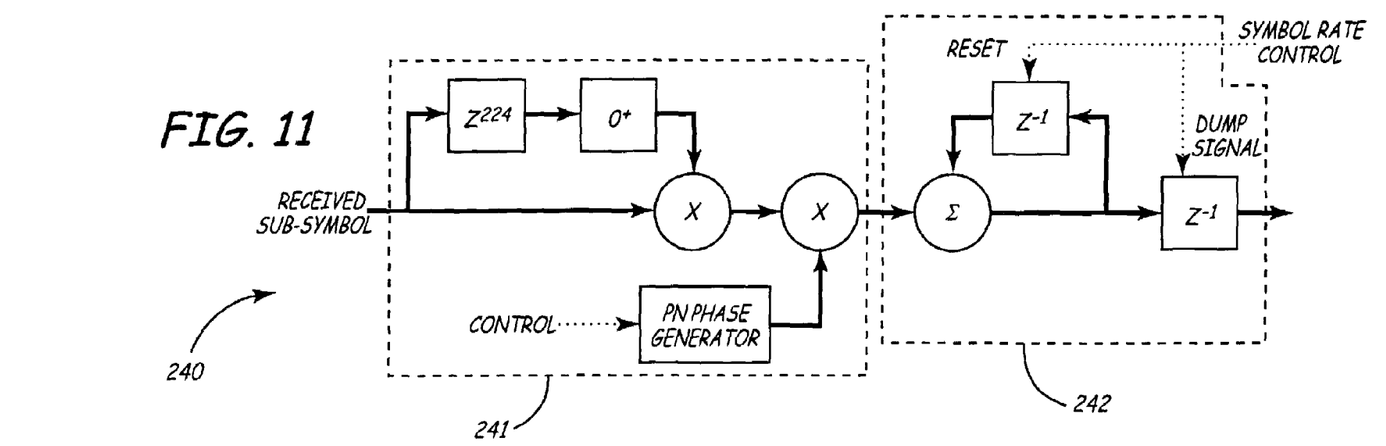
FIG. 11 is a block diagram of a differential decoder and a despreading function.

The decimated FFT samples are demodulated and decoded in decoder block 237 in FIG. 7. A differential decoder 240 determines the phase difference between successive chips or subsymbols transmitted on a specific subchannel. At the output of the FFT 230, these subsymbols are separated by 224 samples. The phase difference calculation requires a complex multiplication with the complex conjugate of the subsymbol received 224 subsymbols prior to the current subsymbol. FIG. 11 shows a block diagram of the differential decoder 240 process. A phase rotator 241 and integrator 242 in FIG. 11 perform the despreading function. The despreading operation rotates the phase of the differentially decoded subsymbols based on the receiver block PN generator 131 in FIG. 9. The synchronization correlator 215 loads a PN phase generator 243 with the same initialization sequence as the transmitter 100 as shown in FIG. 5. The integrator 242 sums the rotated phasors to produce a block output.

A symbol rate control shown in FIG. 11 determines when to reset the integrator 242 and dump the output subsymbol. This control is dependent upon the spreading mode determined from Table 2 to match the transmitted data rate. This output subsymbol is at the coded symbol rate and is passed on to a metric evaluation block 245.

The metric evaluation block 245 measures an Euclidean distance between a received subsymbol and expected subsymbols. Each subsymbol is first converted into a unity gain vector. This vector has the phase of the differentially decoded and despread subsymbols at the coded symbol rate. The vector is then compared with each of the possible received phases. For DS-PSK, all eight received phases are possible. For DQPSK, only the even phases are possible. The metric evaluation block 245 maximizes the odd phases In DQPSK mode to ensure that noise does not cause one of the odd metrics to be the minimum. A minimum metric is desired when evaluating the Euclidean distance. The desired subsymbol that is closest to the received subsymbol has the minimum Euclidean distance metric. The subsymbol that is farthest has the largest Euclidean distance metric. These metrics go into a Viterbi decoder 250 of FIG. 7 that finds the minimum distance path through the decoder trellis to estimate the transmitted bit sequence.

The Viterbi decoder 250 takes the branch metrics and the previous state metrics from the metric evaluation block 245 to evaluate a best path through a decoder trellis. The decoder trellis has the state transitions and branch symbols of the transmitter 100. There are 64 add/compare/select (ACS) blocks that take four metrics from the states that transition into the given state and add the associated branch metrics. Comparator blocks find the path with the minimum metric. The outputs of the ACS block are the new state metric and the bits that correspond to the path with the minimum metric.

The bits corresponding to the minimum metric determined from the ACS block are added to the sequence corresponding to the associated path. Each of the 64 resulting metrics from the ACS blocks is compared with each other to determine the minimum metric. The decoded bits are taken as the MSBs of the path history of the state with the minimum metric.

A path memory is chosen to be as small as possible without affecting bit error performance. A typical memory length for Viterbi decoders is about five to six times the number of memory elements In the encoder. In this example, 64 states, there are six memory elements and the path memory is chosen to be between 30 and 36 symbols. The number of bits is two times the number of symbols since it is a rate ⅔ code.

Figure 12:
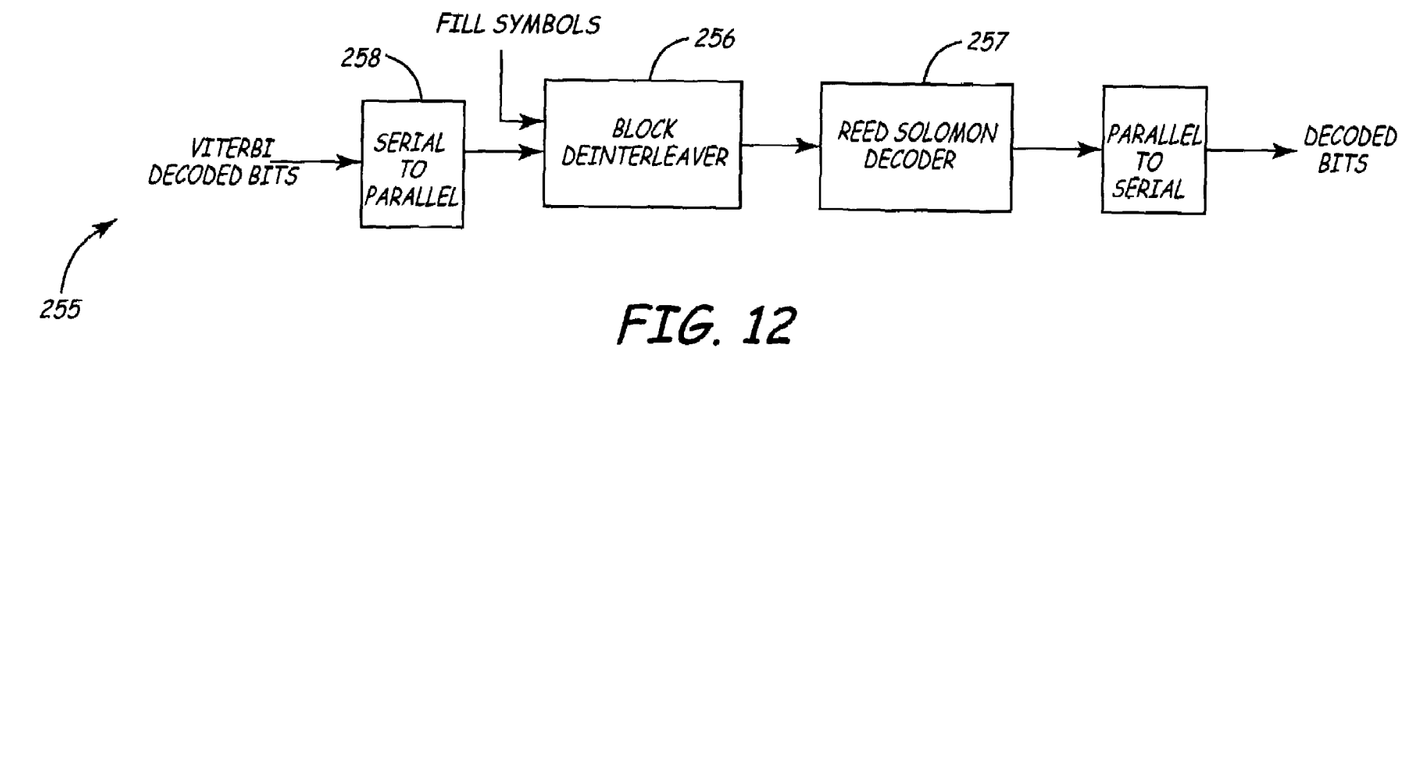
FIG. 12 is a diagram showing the processing for a Reed Solomon decoder.

FIG. 12 shows the block diagram for a deinterleaver/Reed Solomon (RS) decoder 255 signal processing. The Viterbi decoded bits are converted to 8-bit symbols in block 258. Following this conversion, 224 8-bit symbols combine with 31 8-bit O-fill symbols and pass through an 8-bit symbol block deinterleaver 256 to form a Reed Solomon decoder 257 input. The span of the block deinterleaver 256 is over the entire data slot as previously discussed. The RS decoder 257 output is 225 symbols, 194 of which contain data. The output data contains 1552 bits per Reed Solomon block.

It is believed that featureless synchronization in multiuser OFDM system of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An orthogonal frequency division multiplexing (OFDM) communication system for transmitting and receiving data on a plurality of subcarriers and having a featureless synchronization signal transmitted on said subcarriers to correct for a frequency offset and to synchronize a received signal said OFDM communications system comprising:
   a transmitter said transmitter further comprising:
      a coding function for receiving a data input signal and modulating and encoding the data input signal into complex frequency domain data samples;
      a PN sync generator for generating transmit synchronization tones;
      an IFFT function for converting the complex frequency domain data samples and the transmit synchronization tones into a plurality of complex time domain samples in a plurality of IFFT bins on the plurality of subcarriers;
      an add symbol buffer for adding a PN Sequence to the complex time domain samples on the plurality of subcarriers;
      a digital IF up conversion function for converting the complex time domain samples on the plurality of subcarriers to an IF signal for translating and transmitting the complex time domain samples; and
   a receiver for receiving the transmitted complex time domain samples said receiver further comprising:
      a digital IF down conversion for converting the received complex time domain samples;
      a PN sync generator for generating receiver synchronization tones;
      a synchronization correlator for performing timing and frequency estimation on the received complex time domain samples by correlating the transmit synchronization tones and the receiver synchronization tones and generating a frequency vector and a timing control signal;

a multiplier for multiplying the receiver complex time domain samples by the frequency vector to correct for the frequency offset;

a remove symbol buffer for removing the PN sequence with the timing control signal;

a FFT for converting the receiver complex time domain samples into frequency domain samples; and a decoder for demodulating and decoding the frequency domain samples to receive the data.

2. The orthogonal frequency division multiplexing communication system of claim 1 wherein the transmit synchronization tones occupy a number of IFFT bins pseudorandomly selected from the plurality of IFFT bins.

3. The orthogonal frequency division multiplexing communications system of claim 2 wherein the transmitter further comprises a switch for switching between the complex frequency domain data samples and the transmit synchronization tones to place the synchronization tones in the number of IFFT bins.

4. The orthogonal frequency division multiplexing communications system of claim 2 wherein the receiver further comprises a synchronization IFFT that generates time domain receive synchronization tones from the receive synchronization tones.

5. The orthogonal frequency division multiplexing communications system of claim 4 wherein the synchronization correlator performs correlations on the received complex time domain samples containing the transmit synchronization tones in the pseudorandomly selected IFFT bins by correlating with the time domain receive synchronization tones.

6. The orthogonal frequency division multiplexing communications system of claim 5 wherein the synchronization correlator performs a first correlation on a beginning of the received complex time domain sample series with a first correlation vector and a second correlation at an end of the received complex time domain series with a second correlation vector.

7. The orthogonal frequency division multiplexing communications system of claim 6 wherein the synchronization correlation determines a difference in phase between the first correlation and the second correlation to obtain an estimate of the frequency offset.

8. The orthogonal frequency division multiplexing communications system of claim 6 wherein the synchronization correlator performs the first correlation until a threshold is exceeded and continues monitoring the first correlation until the second correlation is performed and then continues to use the first correlation vector to determine when a more significant correlation occurs.

9. The orthogonal frequency division multiplexing communication system of claim 8 wherein the synchronization correlator determines when a larger magnitude correlation occurs between the first and second correlation to determine a desired location of the transmitted signal.

10. The orthogonal frequency division multiplexing communications system of claim 9 wherein the synchronization correlator determines received signal synchronization when a product of the first and second correlation reaches a peak at a predetermined location after the first correlation thereby generating the timing control signal.

11. The orthogonal frequency division multiplexing communications system of claim 9 wherein the synchronization correlator performs correlations on additional received symbols and averages correlation results to improve accuracy.

12. A method of synchronizing in an orthogonal frequency division multiplexing communication system for transmitting and receiving data on a plurality of subcarryiers with a featureless synchronization signal transmitted on said subcarriers to correct for a frequency offset said method comprising the steps of:

modulating and encoding a data input signal into complex frequency domain data samples in a coding function in a transmitter;

generating transmit synchronization tones in a PN sync generator in the transmitter;

converting the complex frequency domain data samples and the transmit synchronization tones into a plurality of complex time domain samples in a plurality of IFFT bins on the plurality of subcarriers in an IFFT function in the transmitter;

adding a pseudorandom sequence to the complex time domain samples on the plurality of subcarriers in an add symbol buffer in the transmitter;

converting the complex time domain samples on the plurality of subcarriers to an IF signal in a digital IF conversion function in the transmitter;

transmitting the converted complex time domain samples;

receiving the transmitted complex time domain samples with a receiver;

converting the received complex time domain samples with a digital IF down conversion in the receiver;

generating receiver synchronization tones in a PN sync generator;

performing timing and frequency estimation on the receiver complex time domain samples by correlating the transmit and receive synchronization tones and generating a frequency vector and a timing control signal in a synchronization correlator;

multiplying the receiver complex time domain samples by the frequency vector to correct for the frequency offset in a multiplier;

removing the pseudorandom sequence in a remove symbol buffer;

converting the complex time domain samples into frequency domain samples in a FFT; and demodulating and decoding the frequency domain samples in a decoder.

13. The method of claim 12 further comprising the steps of:

selecting pseudorandomly in the transmitter a number of IFFT bins from the plurality of IFFT bins for occupation by the transmit synchronization tones; and switching in the transmitter between the complex frequency domain data samples and the transmit synchronization tones to place the synchronization tones In the number of IFFT bins.

14. The method of claim 13 further comprising the steps of:

generating time domain receive synchronization tones from the receiver synchronization tones in a synchronization IFFT in the receiver;

correlating the received complex time domain samples containing the transmit synchronization tones in the pseudorandomly selected IFFT bins with the time domain receiver synchronization tones In the synchronization correlator.

15. The method of claim 14 wherein the synchronization correlator further performs the steps of:

performing a first correlation on a beginning of the received complex time domain sample series with a first correlation vector; and performing a second correlation at an end of the received complex time domain series with a second correlation vector.

16. The method of claim 15 wherein the synchronization correlator further performs the steps of:

performing the first correlation until a threshold is exceeded;

monitoring the first correlation until the second correlation is performed; and continuing to use the first correlation vector to determine when a more significant correlation occurs.

17. The method of claim 16 wherein the synchronization correlator further performs the steps of:

determining when a larger magnitude correlation occurs between the first and second correlation; and determining a desired location of the transmitted signal at the larger magnitude correlation.

18. The method of claim 17 wherein the synchronization correlator further performs the step of determining received signal synchronization when a product of the first and second correlation reaches a peak at a predetermined location after the first correlation.

19. The method of claim 18 wherein the synchronization correlator performs the step of providing an estimate of the frequency offset by taking the difference of phase between the first and second correlation.

20. The method of claim 14 wherein the synchronization correlator performs correlations on additional received symbols to improve accuracy.

* * * * *